(12) United States Patent
Wang et al.

(10) Patent No.: US 8,201,127 B1
(45) Date of Patent: Jun. 12, 2012

(54) METHOD AND APPARATUS FOR REDUCING CLOCK SIGNAL POWER CONSUMPTION WITHIN AN INTEGRATED CIRCUIT

(75) Inventors: Qiang Wang, Campbell, CA (US); Jason H. Anderson, Toronto (CA); Subodh Gupta, Belmont, CA (US)

(73) Assignee: Xilinx, Inc., San Jose, CA (US)

( * ) Notice: Subject to any disclaimer, the term of this patent is extended or adjusted under 35 U.S.C. 154(b) by 810 days.

(21) Appl. No.: 12/273,407

(22) Filed: Nov. 18, 2008

(51) Int. Cl.
*G06F 17/50* (2006.01)
(52) U.S. Cl. .......................... 716/121; 716/128
(58) Field of Classification Search .................. 716/121, 716/128
See application file for complete search history.

(56) References Cited

U.S. PATENT DOCUMENTS

| | | | | |
|---|---|---|---|---|
| 5,963,728 | A * | 10/1999 | Hathaway et al. | 716/108 |
| 6,286,128 | B1 * | 9/2001 | Pileggi et al. | 716/104 |
| 7,412,680 | B1 * | 8/2008 | Gouterman et al. | 716/126 |
| 2007/0245281 | A1 * | 10/2007 | Riepe et al. | 716/9 |

OTHER PUBLICATIONS

J. Lamoureux et al., "Clock-aware placement for FPGAs",. In IEEE International Conference on Field-Programmable Logic and Applications, pp. 124-131, Amsterdam, The Netherlands, Aug. 2007.*
Kuon, Ian et al., "Measuring the Gap Between FPGAs and ASICs," *IEEE Transactions on Computer-Aided Design of Integrated Circuits and Systems*, Feb. 2007, pp. 203-215, vol. 26, No. 2.
Shang, Li et al., "Dynamic Power Consumption in Virtex-II FPGA Family," *Proc. of the 10th International ACM/SIGDA International Symposium on Field Programmable Gate Arrays*, Feb. 24-26, 2002, pp. 157-164, Monterey, California, USA.
Sechen, Carl et al., "The TimberWolf Placement and Routing Package," *IEEE Journal of Solid-State Circuits*, Apr. 1985, pp. 510-522, vol. SC-20, No. 2.
Xilinx, Inc., "Virtex-5 FPGA User Guide," UG190 (v4.0), Mar. 31, 2008, pp. 21-36, available from Xilinx, Inc., 2100 Logic Drive, San Jose, California 95124, USA.
Xilinx, Inc., *Virtex-5 Family Overview*, DS100 (v4.0), Mar. 31, 2008, pp. 1-13, Xilinx, Inc., San Jose, California, USA.

* cited by examiner

*Primary Examiner* — Jack Chiang
*Assistant Examiner* — Brandon Bowers
(74) *Attorney, Agent, or Firm* — Michael T. Wallace; LeRoy D. Maunu; Thomas George (57) ABSTRACT

A method is provided whereby a placement-based cost function is utilized to minimize leakage and dynamic power that is consumed by clock networks implemented within integrated circuits (ICs) such as field programmable gate arrays (FPGAs). An initial placement of clock signal loads is analyzed to determine whether an alternative placement of clock signal loads results in the reduction of the usage of vertical clock spines, or equivalently, the optimization of the cost function. Several desirable characteristics are obtained through strategic clock signal load placement within the FPGA in accordance with the cost function. First, the number of clock regions spanned by a particular clock signal is minimized. Second, interconnect capacitance within the clock region is also minimized. By minimizing the total capacitance of a particular clock network implemented within a clock region, the leakage and dynamic power consumed by the clock network within the clock region is also minimized.

18 Claims, 8 Drawing Sheets

METHOD AND APPARATUS FOR REDUCING CLOCK SIGNAL POWER CONSUMPTION WITHIN AN INTEGRATED CIRCUIT

FIELD OF THE INVENTION

The present invention generally relates to configurable device placement within an integrated circuit, and more particularly to a method for placement of the configurable devices in order to reduce power consumption.

BACKGROUND OF THE INVENTION

PLDs are a well-known type of integrated circuit (IC) that may be programmed to perform specified logic functions. One type of PLD, the Field Programmable Gate Array (FPGA), typically includes an array of programmable tiles. These programmable tiles can include, for example, Input/Output Blocks (IOBs), Configurable Logic Blocks (CLBs), dedicated Random Access Memory Blocks (BRAM), multipliers, Digital Signal Processing blocks (DSPs), processors, clock managers, Delay Lock Loops (DLLs), Multi-Gigabit Transceivers (MGTs) and so forth.

Each programmable tile typically includes both programmable interconnect and programmable logic. The programmable interconnect typically includes a large number of interconnect lines of varying lengths interconnected by Programmable Interconnect Points (PIPs). The programmable logic implements the logic of a user design using programmable elements that may include, for example, function generators, registers, arithmetic logic, and so forth.

The programmable interconnect and the programmable logic are typically programmed by loading a stream of configuration data into internal configuration memory cells during a configuration event that defines how the programmable elements are configured. The configuration data may be read from memory (e.g., from an external PROM) or written into the FPGA by an external device. The collective states of the individual memory cells then determine the function of the FPGA.

Another type of PLD is the Complex Programmable Logic Device, or CPLD. A CPLD includes two or more "function blocks" connected together and to input/output (I/O) resources by an interconnect switch matrix. Each function block of the CPLD includes a two-level AND/OR structure similar to those used in Programmable Logic Arrays (PLAs) and Programmable Array Logic (PAL) devices. In CPLDs, configuration data is typically stored on-chip in non-volatile memory. In some CPLDs, configuration data is stored on-chip in non-volatile memory, then downloaded to volatile memory as part of an initial configuration (programming) sequence.

For all of these PLDs, the functionality of the device is controlled by configuration data bits provided to the device for that purpose. The configuration data bits can be stored in volatile memory (e.g., static memory cells, as in FPGAs and some CPLDs), in non-volatile memory (e.g., FLASH memory, as in some CPLDs), or in any other type of memory cell.

Some PLDs, such as the Xilinx Virtex® FPGA, can be programmed to incorporate blocks with pre-designed functionalities, i.e., "cores". A core can include a predetermined set of configuration data bits that program the FPGA to perform one or more functions. Alternatively, a core can include source code or schematics that describe the logic and connectivity of a design. Typical cores can provide, but are not limited to, DSP functions, memories, storage elements, and math functions. Some cores include an optimally floor planned layout targeted to a specific family of FPGAs. Cores can also be parameterizable, i.e., allowing the user to enter parameters to activate or change certain core functionality.

Unlike custom ICs, an FPGA includes a clock signal network that is pre-fabricated and programmable. As such, the programmability of the FPGA clock signal network must be flexible enough to meet the various connectivity, skew, and latency objectives for a variety of clock signal fanout and load placement topologies. Modern FPGAs, therefore, constrain logic resources to specific regions within the FPGA, i.e., clock regions. Each clock region may then be programmably allocated a fixed number of clock signals, where the fixed number of clock signals is programmably selected from a larger number of clock signals that are available on the FPGA.

Accordingly, a large number of clock signals may exist on the FPGA to provide flexibility to each clock region, while at the same time mitigating the costs associated with constructing large numbers of clock networks throughout the FPGA. Such flexibility, however, yields a propensity for inefficient clock signal provisioning within each clock region because the capacitive loading within each clock region is not optimized. As such, excessive leakage and dynamic power may be consumed within each clock region as a consequence of charging and discharging the capacitive loads within each clock region.

Efforts continue, therefore, to reduce leakage and dynamic power consumption within an IC, such as an FPGA, by recognizing the structure and programmability of the clock network architecture within the FPGA. Using architectural knowledge of the FPGA, efficient usage of the pre-fabricated clock network may be realized to reduce the capacitive load within each clock region, thereby reducing the leakage and dynamic power consumed within each clock region of the FPGA.

SUMMARY OF THE INVENTION

To overcome limitations in the prior art, and to overcome other limitations that will become apparent upon reading and understanding the present specification, various embodiments of the present invention disclose a method for the optimal placement of clock signal loads within an integrated circuit in order to reduce power consumption within the integrated circuit.

In accordance with one embodiment of the invention, a method of optimally placing load components within an integrated circuit to reduce power consumption within the integrated circuit comprises initially placing a plurality of load components within a proposed integrated circuit layout. For each of the plurality of load components initially placed, selecting a load component from the plurality of load components, comparing an initial placement of the selected load component to initial placements of the remaining plurality of load components, determining whether movement of the selected load component to an alternative placement improves a power reduction cost function, and moving the selected load component to the alternative placement in response to an affirmative determination.

In accordance with another embodiment of the invention, a logic block placement system comprises a processor that is adapted to execute physical design tools to facilitate placement of logic blocks within an integrated circuit to reduce power consumption within the integrated circuit. The processor is adapted to initially place a plurality of load components within a proposed integrated circuit layout. For each of the plurality of load components initially placed, the processor is further adapted to select a load component from the plurality of load components, compare an initial placement of the selected load component to initial placements of the remaining plurality of load components, determine whether movement of the selected load component improves a power reduction cost function, and move the selected load component in response to an affirmative determination.

In accordance with another embodiment of the invention, an integrated circuit comprises a plurality of configurable logic blocks that are arranged in first and second pluralities of vertical columns, where ones of the first plurality of vertical columns align with corresponding ones of the second plurality of vertical columns. The integrated circuit further comprises a plurality of clock root spines that are displaced between the first and second plurality of vertical columns, where the plurality of clock root spines are coupled to provide a plurality of clock signals to a portion of the plurality of configurable logic blocks arranged within a region of the integrated circuit. The integrated circuit further comprises a plurality of vertical clock spines that are displaced to intersect the plurality of clock root spines, where a portion of the plurality of vertical clock spines programmably couples to a portion of the plurality of clock root spines to programmably couple a portion of the plurality of clock signals to the region of configurable logic blocks. A number of vertical clock spines used to provide clock signals to the region of configurable logic blocks is minimized.

BRIEF DESCRIPTION OF THE DRAWINGS

Various aspects and advantages of the invention will become apparent upon review of the following detailed description and upon reference to the drawings in which.

DETAILED DESCRIPTION

Generally, various embodiments of the present invention provide a method whereby a placement-based approach is utilized to minimize leakage and dynamic power that is consumed by clock networks implemented within integrated circuits (ICs) such as field programmable gate arrays (FPGAs). Several desirable characteristics are obtained through strategic clock network placement within the FPGA, which includes: 1) the minimization of the number of clock regions spanned by a particular clock signal to minimize the total capacitance imposed upon the clock signal; and 2) the minimization of interconnect capacitance within the clock region. Through efficient placement of clock signal loads, i.e., devices within the IC that receive a clock signal, within each clock region, the total capacitance of the clock region is also minimized, which reduces the leakage and dynamic power consumed by the clock network within the clock region.

The optimized placement of clock signal loads within a clock region, however, may not necessarily correspond to traditional placement objectives. That is to say, in other words, that traditional placement objectives seek to minimize the wire length of a single net. Wire length is usually estimated by the sum of the half-perimeters of signal bounding boxes of the net, where a bounding box is defined by the smallest rectangle which encompasses all component pins that comprise the net.

In accordance with the present invention, however, minimization of leakage and dynamic power consumption is also a design constraint. Thus, the various embodiments of the present invention additionally seek to minimize the number of vertical clock spines that are utilized within a clock region, where a vertical clock spine is defined to be the interconnect routing of a selected clock signal on a half column (either upper or lower half column) within a clock region, which may contain several different types of programmable logic blocks.

Figure 1:
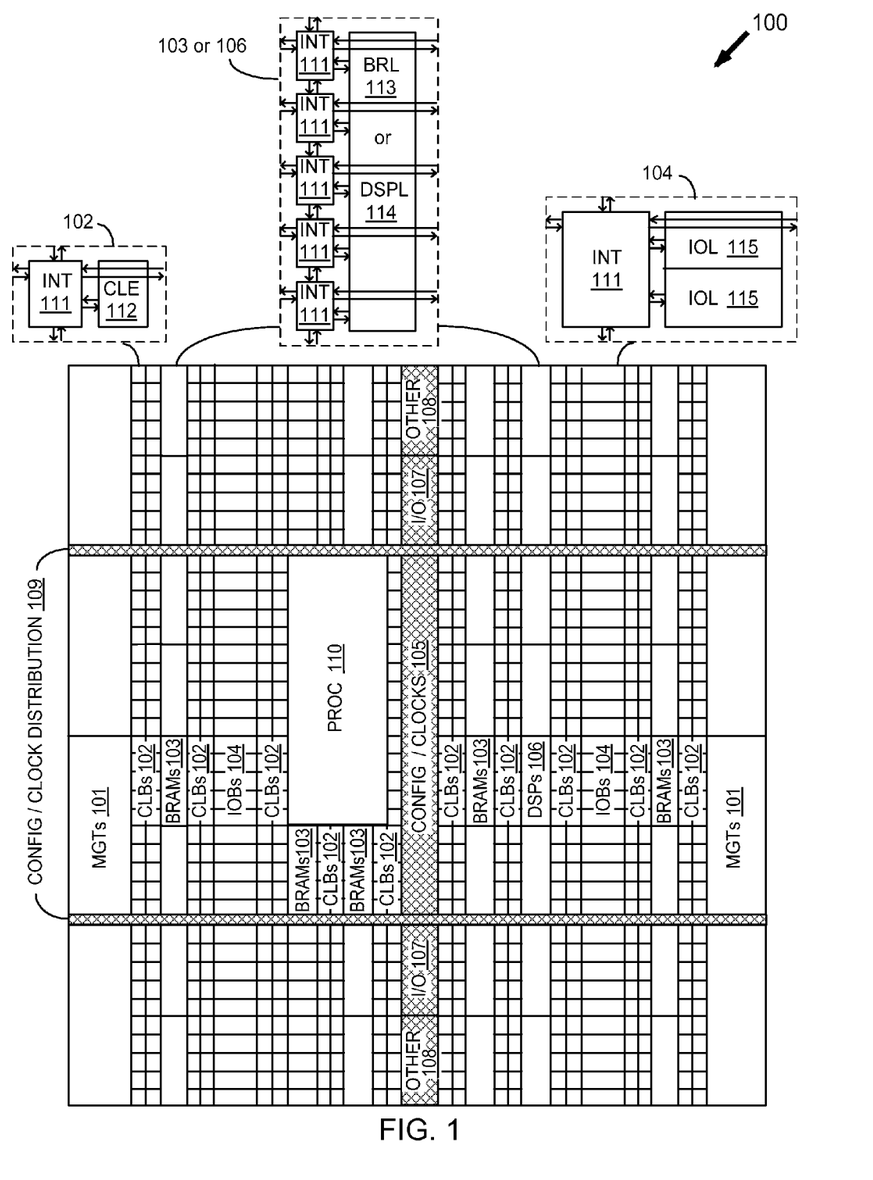
FIG. 1 illustrates an FPGA architecture that includes several different types of programmable logic blocks.

Advanced FPGAs can include several different types of programmable logic blocks in the array. Turning to FIG. 1, for example, FPGA architecture 100 of FIG. 1 includes a large number of different programmable tiles including multi-gigabit transceivers (MGTs 101), configurable logic blocks (CLBs 102), random access memory blocks (BRAMs 103), input/output blocks (IOBs 104), configuration and clocking logic (CONFIG/CLOCKS 105), digital signal processing blocks (DSPs 106), specialized input/output blocks (I/O 107) (e.g., configuration ports and clock ports), and other programmable logic 108 such as digital clock managers, analog-to-digital converters, system monitoring logic, and so forth. Some FPGAs also include dedicated processor blocks (PROC 110).

In some FPGAs, each programmable tile includes a programmable interconnect element (INT 111) having standardized connections to and from a corresponding interconnect element in each adjacent tile. Therefore, the programmable interconnect elements taken together implement the programmable interconnect structure for the illustrated FPGA. The programmable interconnect element (INT 111) also includes the connections to and from the programmable logic element within the same tile, as shown by the examples included at the top of FIG. 1.

For example, a CLB 102 can include a configurable logic element (CLE 112) that can be programmed to implement user logic plus a single programmable interconnect element (INT 111). A BRAM 103 can include a BRAM logic element (BRL 113) in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 106 can include a DSP logic element (DSPL 114) in addition to an appropriate number of programmable interconnect elements. An IOB 104 can include, for example, two instances of an input/output logic element (IOL 115) in addition to one instance of the programmable interconnect element (INT 111). As will be clear to those of skill in the art, the actual I/O pads connected, for example, to the I/O logic element 115 typically are not confined to the area of the input/output logic element 115.

In the pictured embodiment, a columnar area near the center of the die (shown shaded in FIG. 1) is used for configuration, clock, and other control logic. Horizontal areas 109 extending from this column are used to distribute the clock signals and configuration signals across the breadth of the FPGA.

Some FPGAs utilizing the architecture illustrated in FIG. 1 include additional logic blocks that disrupt the regular columnar structure making up a large part of the FPGA. The additional logic blocks can be programmable blocks and/or dedicated logic. For example, the processor block PROC 110 shown in FIG. 1 spans several columns of CLBs and BRAMs.

Note that FIG. 1 is intended to illustrate only an exemplary FPGA architecture. For example, the numbers of logic blocks in a column, the relative width of the columns, the number and order of columns, the types of logic blocks included in the columns, the relative sizes of the logic blocks, and the interconnect/logic implementations included at the top of FIG. 1 are purely exemplary. For example, in an actual FPGA more than one adjacent column of CLBs is typically included wherever the CLBs appear, to facilitate the efficient implementation of user logic, but the number of adjacent CLB columns varies with the overall size of the FPGA.

Figure 2:
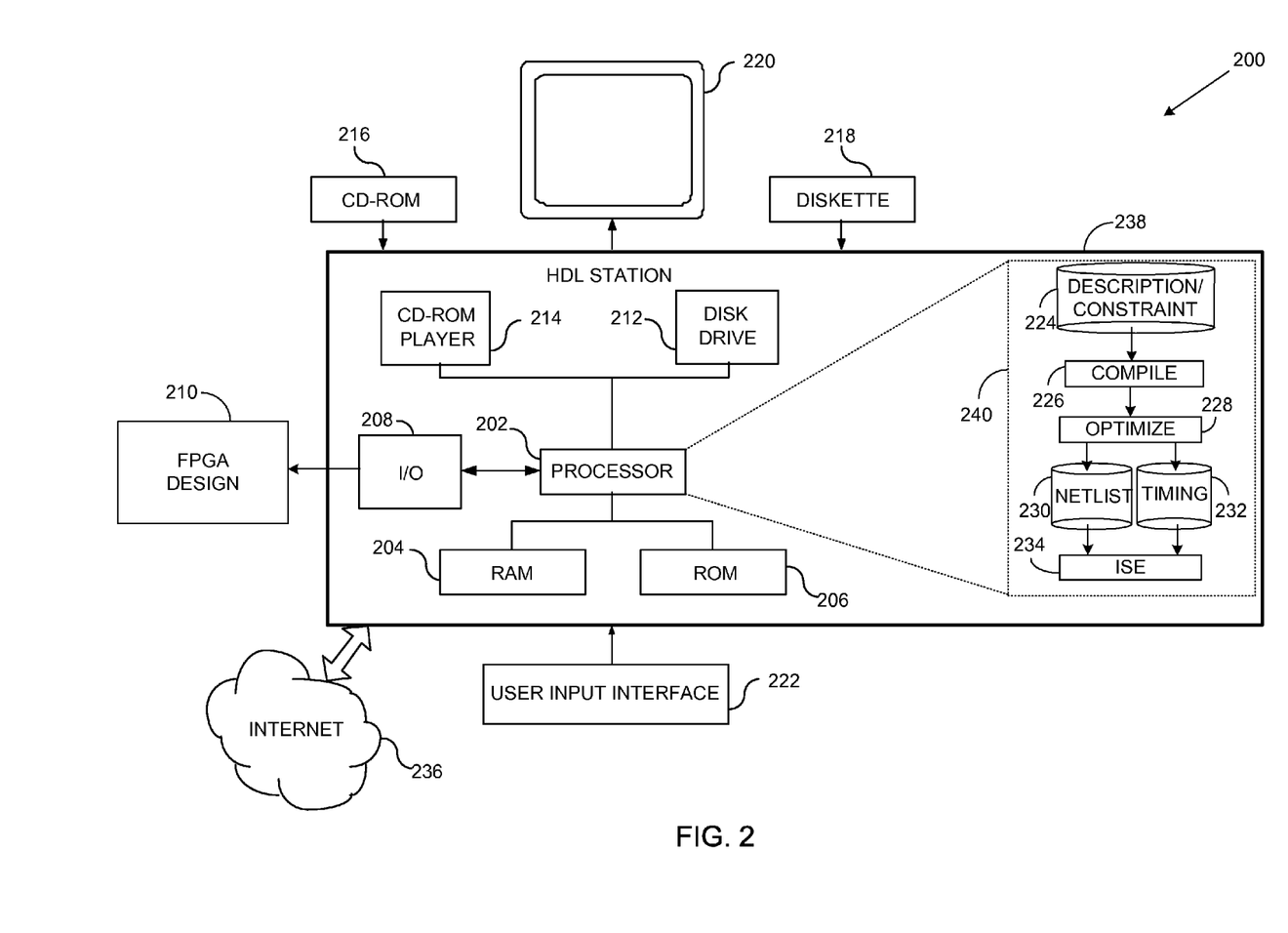
FIG. 2 illustrates an exemplary hardware description language (HDL) development station that may be used to define portions of the FPGA architecture of FIG. 1.

The placement of clock signal loads within the clock regions of an integrated circuit, such as FPGA 100 of FIG. 1, may be realized by the designer at an HDL development station as exemplified in FIG. 2. Verilog and VHDL represent two of the more popular HDL languages in use today, which may be used to define the structure of a PLD based design. In particular, HDL facilitates a description of the manner in which a design is decomposed into logic regions and further allows a description of the manner in which each logic region of the design is to be interconnected.

The exemplary computing arrangement that is suitable for performing HDL definition activities in accordance with the various embodiments of the present invention includes HDL station 238, which includes a central processor (CPU) 202 coupled to random access memory (RAM) 204 and read-only memory (ROM) 206. The ROM 206 may also be other types of storage media to store programs, such as programmable ROM (PROM), electronically erasable PROM (EEPROM), etc. The processor 202 may communicate with other internal and external components through input/output (I/O) circuitry 208 to provide, for example, a configuration bit stream to define the one or more FPGAs that may exist within FPGA 210.

HDL station 238 may include one or more data storage devices, including hard and floppy disk drives 212, CD-ROM drives 214, and other hardware capable of reading and/or storing information such as a DVD, etc. Software for facilitating the FPGA design definitions in accordance with an embodiment of the present invention may be stored and distributed on a CD-ROM 216, diskette 218 or other form of media capable of portably storing information. These storage media may be inserted into, and read by, devices such as the CD-ROM drive 214, the disk drive 212, etc.

The software for facilitating the FPGA design definitions may also be transmitted to HDL station 238 via data signals, such as being downloaded electronically via a network, such as Internet 236. HDL station 238 is coupled to a display 220, which may be any type of known display or presentation screen, such as LCD displays, plasma displays, cathode ray tubes (CRT), etc. A user input interface 222 is provided, including one or more user interface mechanisms such as a mouse, keyboard, microphone, touch pad, touch screen, voice-recognition system, etc.

Processor 202 may be used to execute FPGA physical design tools 240 to aid in the minimization and optimization of the equations extracted from the HDL files. For example, description/constraint files 224 may provide, among other definitions, a description of the geographic regions, i.e., sites, within the FPGA that are to be utilized to implement each clock region of FPGA 210. Description/constraint files 224 may also provide constraints that enforce the minimization of the wire length used to connect components within each clock region. As discussed in more detail below, description/constraint files 224 also constrain the usage of vertical clock spines within each clock region so as to reduce leakage and dynamic power consumption.

Compiler 226 parses through the resulting HDL behavioral source code and description/constraint files 224 to extract known functions, e.g., arithmetic functions, multiplexers, memories, etc., that correspond to the various logic blocks of the user design, which are then optimized by optimize block 228. Net list 230, timing 232, and integrated software environment (ISE) block 234 each interoperate to formulate FPGA 210 that is substantially dependent upon the intended FPGA's architecture and context, while optimizing the placement of the compiled logic blocks within FPGA 210 in accordance with a cost function to facilitate power consumption reduction. The context, for example, may influence inter-function optimizations such as replication, merging, re-timing, and pipelining that may be defined by the timing requirements and topology of the design. Once the design is complete, it may be realized within FPGA 210, portions of which are exemplified by FIGS. 3-7 as discussed in more detail below.

Figure 3:
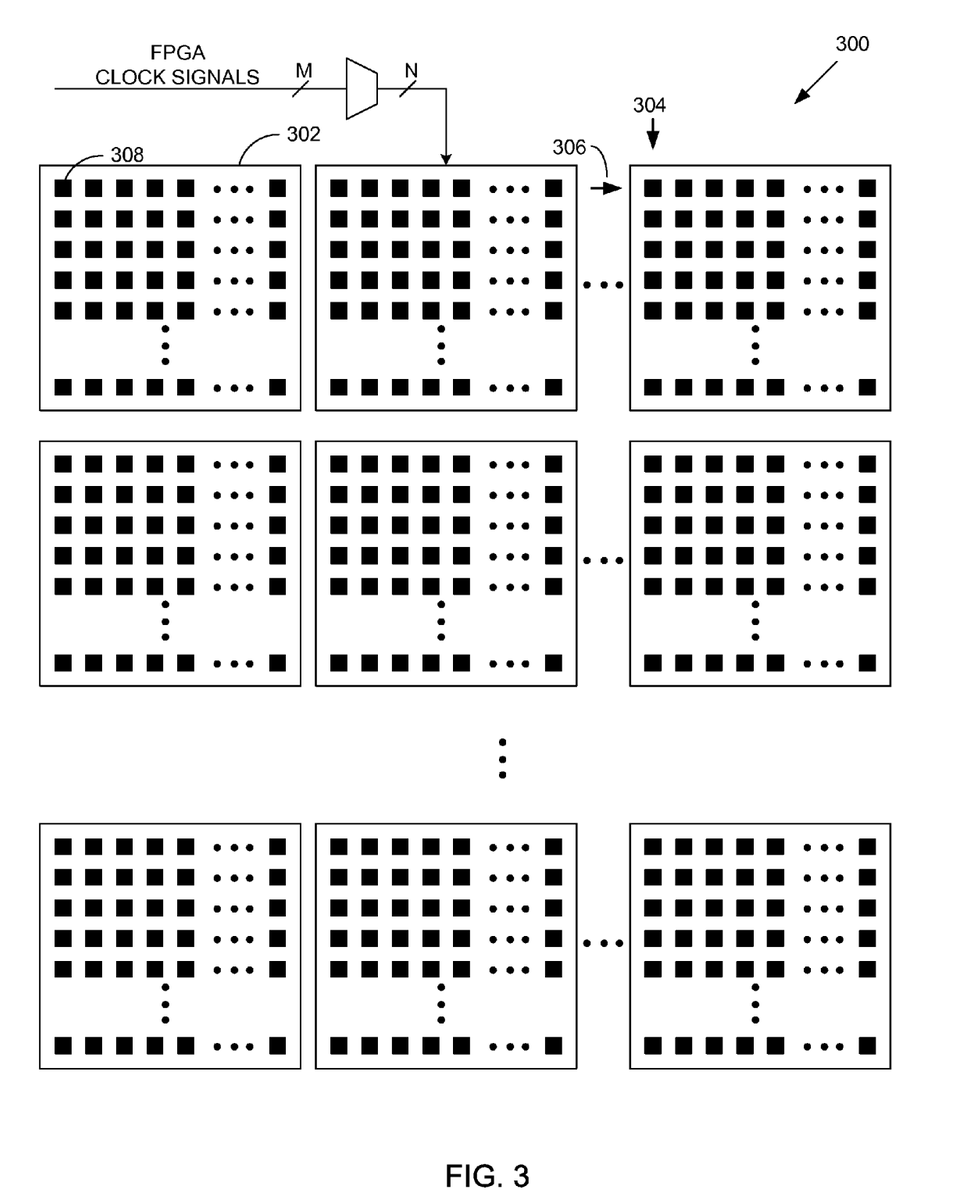
FIG. 3 illustrates the clock regions and associated logic blocks of the FPGA of FIG. 1.

Turning to FIG. 3, for example, a simplified block diagram of FPGA 300 is illustrated, whereby the number of clock regions 302, the number of logic blocks 308, the number of logic block columns 304 in each clock region 302, and the number of logic block rows 306 in each clock region 302, is dependent upon the particular FPGA architecture target being utilized for FPGA 210 of FIG. 2. Although highly simplified, FIG. 3 is illustrative of the programmability within an FPGA that exists on a region-by-region basis.

In particular, each clock region 302 defines a collection of a number of logic blocks 308. Each clock region 302 is further defined by the number of FPGA clock signals that may enter each clock region 302. Generally, an integer number, M, of FPGA clock signals may exist within FPGA 100 of FIG. 1 and an integer number, N, of the FPGA clock signals may be multiplexed into each clock region 302, where N<M. The FPGA clock signals may be generated externally to FPGA 100, or conversely, may be generated on-chip through the use of phase locked loops (PLLs), delay locked loops (DLLs), or other circuitry contained within the FPGA. Information contained within the configuration bit stream that is used to configure FPGA 100 defines the integer number, N, and further defines which of the FPGA clock signals, M, are to be multiplexed into each clock region 302. It can be seen, therefore, that by utilizing the clock region architecture of FIG. 3, a large number of clock signals may be supported within FPGA 100, while mitigating costs associated with the construction of a large number of clock networks within FPGA 100.

Figure 4:
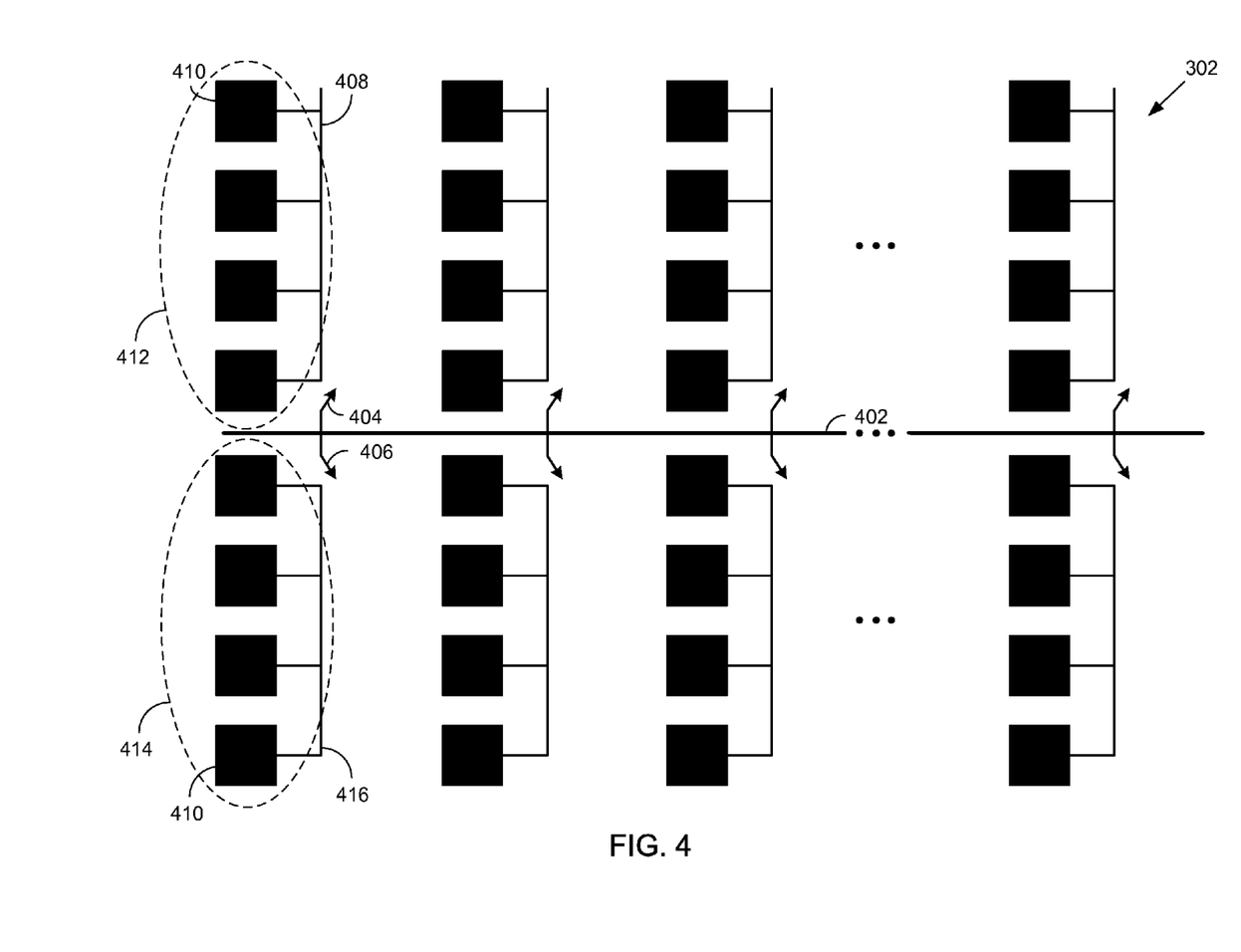
FIG. 4 illustrates a detailed block diagram of a single clock region within the FPGA of FIG. 3.

Turning to FIG. 4, a more detailed block diagram of clock region 302 is illustrated, which exemplifies the clock signal provisioning that exists within each clock region 302. In particular, an FPGA clock signal may be selected to enter clock region 302 via clock root spine 402. While only a single clock root spine is illustrated in FIG. 4 for sake of clarity, it is noted that an integer number, M, of clock root spines 402 may exist for each clock region 302.

Each clock root spine 402 enters each clock region 302 at a midpoint, such that an equal number of logic blocks, e.g., clock signal load components 410, exist along first and second vertical paths that intersect clock root spine 402. For example, vertical clock spine 408 intersects clock root spine 402 via the programmable coupling to clock root spine 402 that is provided by programmable switch 404. Similarly, vertical clock spine 416 intersects clock root spine 402 via the programmable coupling to clock root spine 402 that is provided by programmable switch 406. Thus, propagation of the clock signal that is incident on clock root spine 402 along each of vertical clock spines 408 and 416 is dependent upon the programmable position of switches 404 and 406, respectively.

In particular, a bit within the configuration bit stream that is used to configure FPGA 100 selects whether the position of programmable switch 404 is open or closed. If closed, each of clock signal loads 412 receive the clock signal that is present on clock root spine 402 via vertical clock spine 408. If open, on the other hand, clock signal loads 412 do not receive the clock signal that is present on clock root spine 402. Similarly, a bit within the configuration bit stream that is used to configure FPGA 100 selects whether the position of programmable switch 406 is open or closed. If closed, each of clock signal loads 414 receive the clock signal that is present on clock root spine 402 via vertical clock spine 416. If open, on the other hand, clock signal loads 414 do not receive the clock signal that is present on clock root spine 402.

In accordance with one embodiment of the present invention, the placement of clock signal loads by FPGA physical design tools 240 of FIG. 2 minimizes the number of vertical clock spines that are used to route a clock signal into clock region 302. In so doing, the magnitude of leakage and dynamic power consumed by clock region 302 is minimized. The clock signal loads of FPGA 210, for example, are efficiently placed into particular locations, i.e., sites, on the FPGA, such that related sites are geographically close to one another on the FPGA.

The placement process begins by assigning an initial placement of clock signal loads using ISE block 234 of FIG. 2 and then iteratively refining the initial placement for optimization. Aside from wire length constraints, other design constraints, such as timing and power consumption restrictions may also be enforced so as to adhere to user specifications or specifications imposed by the target FPGA. All design constraints may then be encoded into a cost function that determines the quality of the placement of each clock signal load. Clock signal load placements exhibiting lower cost function values, for example, are superior to those placements exhibiting a relatively higher cost function value.

In accordance with one embodiment of the present invention, power reduction is obtained by reducing the usage of vertical clock spines within each clock region. Thus, incorporation of vertical clock spine reduction parameters into the cost function is required, which necessitates the identification of those sites that are more conducive to the reduction of vertical clock spine usage than other sites.

Figure 5:
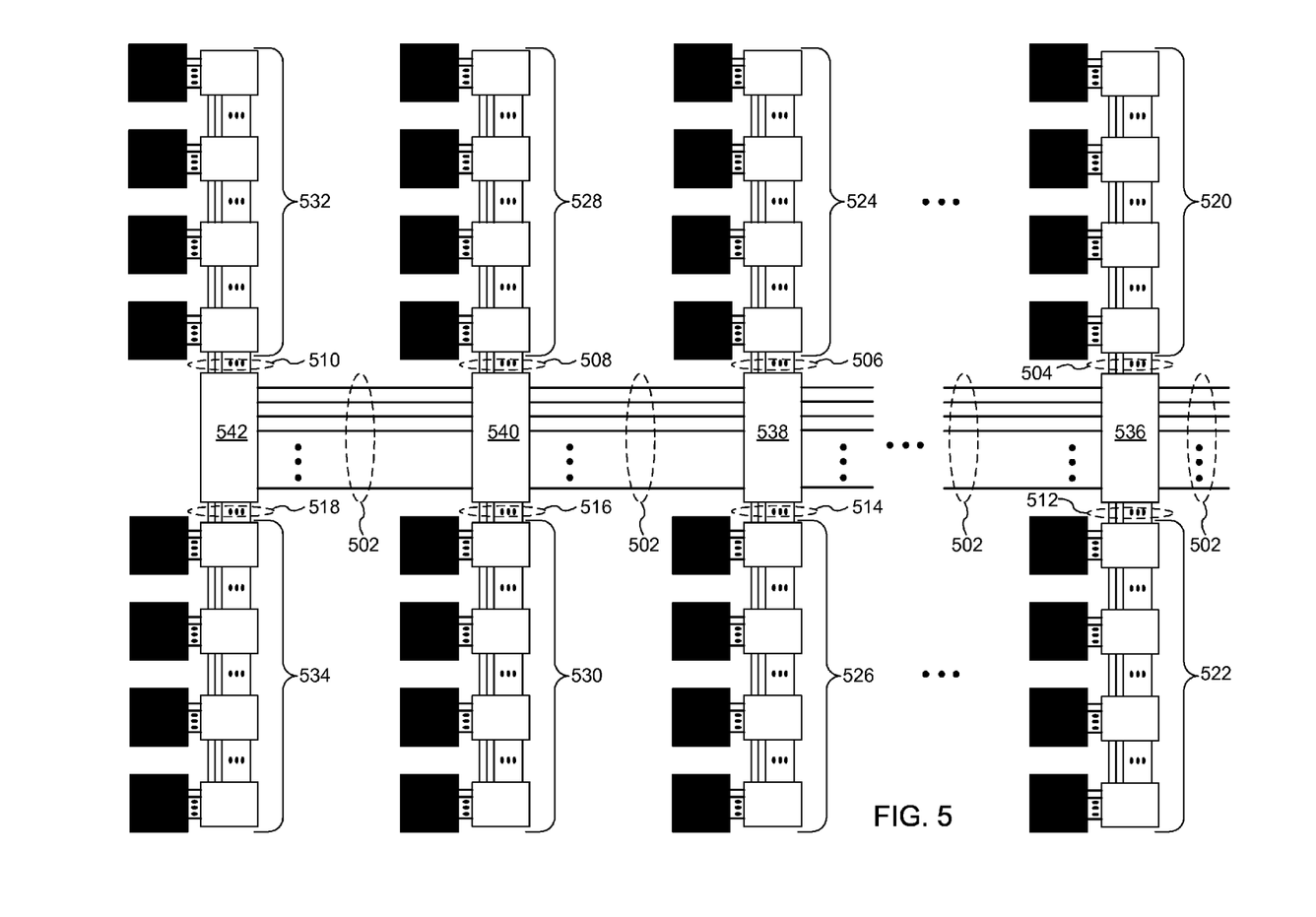
FIG. 5 illustrates a detailed block diagram of a clock resource model within a clock region of the FPGA of FIG. 3.

Identification of the sites that are more conducive to the reduction of vertical clock spine usage within each clock region is based upon a clock resource model, which is exemplified by the clock resource model of FIG. 5. As illustrated, clock root spine 502 delivers an integer number, M, of FPGA 100 clock signals inside the clock region. A subset, N, of FPGA clock signals may then be programmably selected by programmable switches 536-542 to enter the upper vertical clock spines 504-510 and/or the lower vertical clock spines 512-518. The subset, N, of FPGA clock signals may be less than or equal to the integer number, M, of FPGA clocks signals. Programmable switches 520-534 are similarly programmed to determine which of the respective subsets, N, of FPGA clock signals provided by vertical clock spines 504-518 are to be provided to their respective clock signal loads.

Using the clock signal model of FIG. 5 and the respective configuration bit stream settings that are used to route FPGA clock signals within the clock region, the status of site locations within the clock region may be obtained by ISE block 234 of FIG. 2. In addition, all clock load components may be identified within the site locations, which further facilitates the calculation of vertical clock spine usage within each clock region. As such, ISE block 234 may be utilized to minimize vertical clock spine usage through an iterative algorithm, thereby minimizing leakage and dynamic power consumption within FPGA 100.

Figure 6:
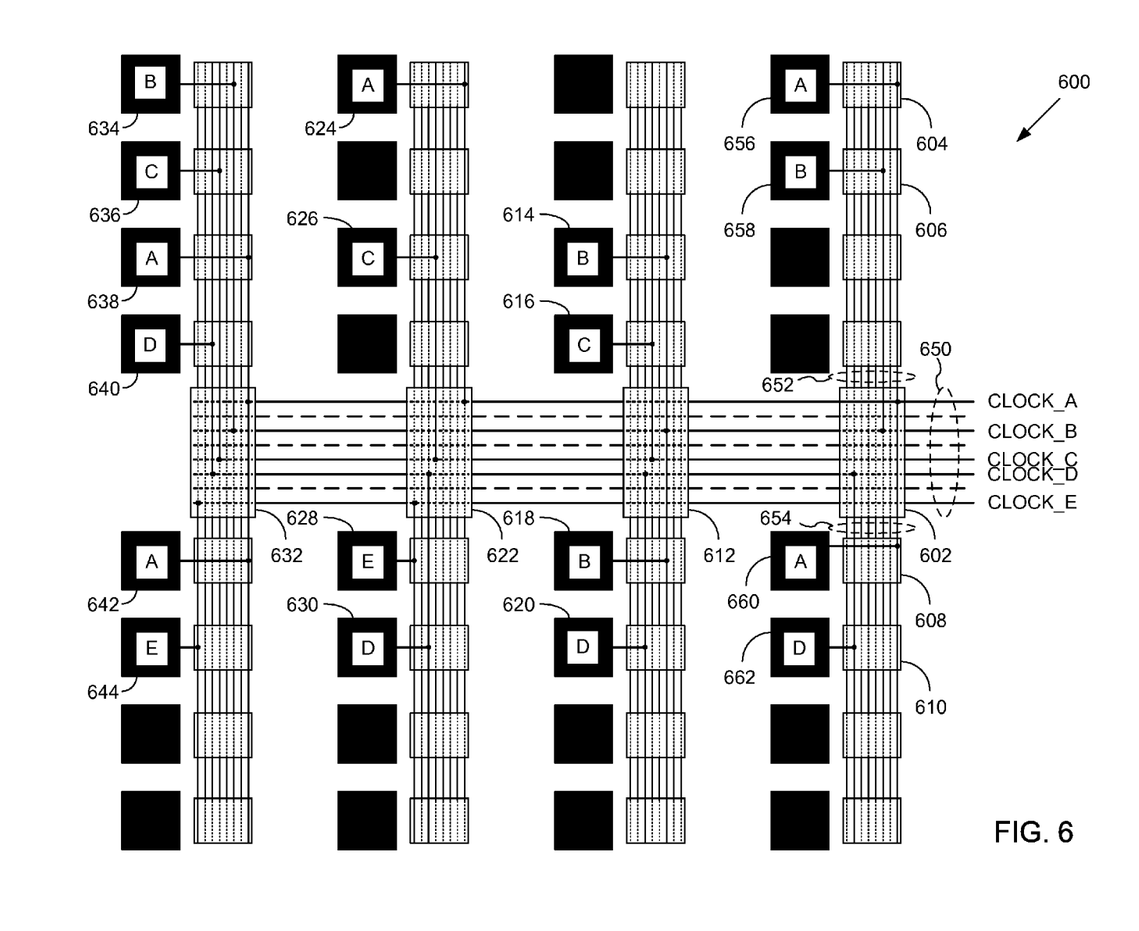
FIG. 6 illustrates a block diagram of an initial clock signal load placement in accordance with one embodiment of the present invention.

Turning to FIG. 6, for example, a block diagram of FPGA clock region 600 is depicted after an initial placement of clock signal loads A-E and their respective FPGA clock signal inputs has been established by ISE block 234. In the exemplary embodiment, it is noted that 5 FPGA clock signals, CLOCK_A through CLOCK_E, have been selected by programmable switches 602, 612, 622, and 632 for entry into clock region 600. In addition, an exemplary number of clock signal loads, e.g., 32, are designated to be contained within clock region 600, whereas only 18 of the 32 clock signal loads are configured to receive clock signal inputs.

As illustrated, switch 602 programmably couples to clock root spines 650 to provide clock signals, CLOCK_A and CLOCK_B, to upper vertical clock spines 652. Switches 604 and 606 programmably couple to vertical clock spines 652 to provide clock signal, CLOCK_A, to clock signal load 656 and clock signal, CLOCK_B, to clock signal load 658. In addition, switch 602 programmably couples to clock root spines 650 to provide clock signals, CLOCK_A and CLOCK_D, to lower vertical clock spines 654. Switches 608 and 610 programmably couple to vertical clock spines 654 to provide clock signal, CLOCK_A, to clock signal load 660 and clock signal, CLOCK_D, to clock signal load 662. It can be verified that clock signal loads 614-620, 624-630, and 634-644 similarly receive their respective clock signals through programmable coupling to clock root spines 650 and respective upper and lower vertical clock spines.

By inspection, it is noted that each clock signal is programmably coupled to a number of load components. In particular, clock signal, CLOCK_A, is programmably coupled to 5 load components, e.g., 656, 660, 624, 638, and 642; clock signal, CLOCK_B, is programmably coupled to 4 load components, e.g., 658, 614, 618, and 634; clock signal, CLOCK C, is programmably coupled to 3 load components, e.g., 616, 626, and 636; clock signal, CLOCK_D, is programmably coupled to 4 load components, e.g., 662, 620, 630, and 640; and clock signal, CLOCK_E, is programmably coupled to 2 load components, e.g., 628 and 644. Also by inspection, it is further noted that a total of 18 vertical clock spines are placed within clock region 600.

Once the load components of FIG. 6 are placed, ISE block 234 attempts to optimize the initial placement of load components within clock region 600 to minimize vertical clock spine usage, thereby minimizing power consumption. In particular, ISE block 234 attempts a series of pair-wise load component swaps between 2 sites on the FPGA, whereby ISE block 234: 1) identifies two or more load components existing in their respective "source" sites; and 2) considers movement of the two or more load components to a number of potential alternative placement "target" sites. For each target site considered, ISE block 234 evaluates the impact upon the vertical clock spine cost function value as a result of the load component movement. The load component movement that causes the most positive impact, i.e., minimization of the vertical clock spine cost function value, is taken as the preferred placement for the load components.

The vertical clock spine cost function may be formulated using two primary factors. The first factor, the so-called "anchoring" factor, is utilized to determine whether a vertical clock spine should be utilized to provide a particular FPGA clock signal. The second factor, the so-called "attracting" factor, is utilized to indicate a direction in which the load component should be moved.

Minimization of the vertical clock spine cost function value is implemented by encouraging the movement of load components that receive the same clock signal to a fewer number of vertical clock spines. Minimization of the vertical clock spine cost function value is further implemented by selecting certain vertical clock spines as so-called "anchor spines," which represent the preferred destination for load components.

For each load component, the vertical clock spine cost function seeks to evaluate whether the current placement of that load component can share a vertical clock spine with other load components that share the same clock signal. In particular, maximization of the number of load components that share the same vertical clock spine results in a decrease in the vertical clock spine cost function value. The vertical clock spine cost function simultaneously seeks the shortest distance between the current load component and the closest anchor spine, which also results in a decrease in the vertical clock spine cost function value.

In a first embodiment, the vertical clock spine cost function may be expressed as in equation (1):

$$C_{clock\_spine\_reduction} = \sum_{i=1}^{n} C_{TS_i} + \sum_{j=1}^{m} C_{TA_j}, \quad (1)$$

where the first summation represents the total cost of all used vertical clock spines and the second summation represents an attraction value to draw load components to anchor spines. $C_{TSi}$ is equal to $S/L_i$, where S is a constant cost function value for using a single vertical clock spine, $L_i$ is the total number of load components that are connected through a particular vertical clock spine, i, and n is the total number of vertical clock spines used to place all load components. $C_{TAj}$ is equal to $A*D_j$, where A is a constant cost function value for one of the load components, $D_j$ is the distance between a load component, j, and the closest anchor spine, and m is the total number of load components to be placed on the FPGA. The value of $D_j$ is equal to zero if load component, j, is already placed on an anchor spine.

ISE block 234 seeks to minimize vertical clock spine usage, while also minimizing deleterious effects on other aspects of the placement. Consequently, the relative priority of the anchoring and attracting factors with other cost function factors, such as wire length and timing, are negotiated by ISE block 234 so as to maintain the overall quality of the placement. As such, ISE block 234 may consider all cost function factors so that vertical clock spine usage and power consumption are minimized, while simultaneously meeting all other design requirements and constraints.

Figure 7:
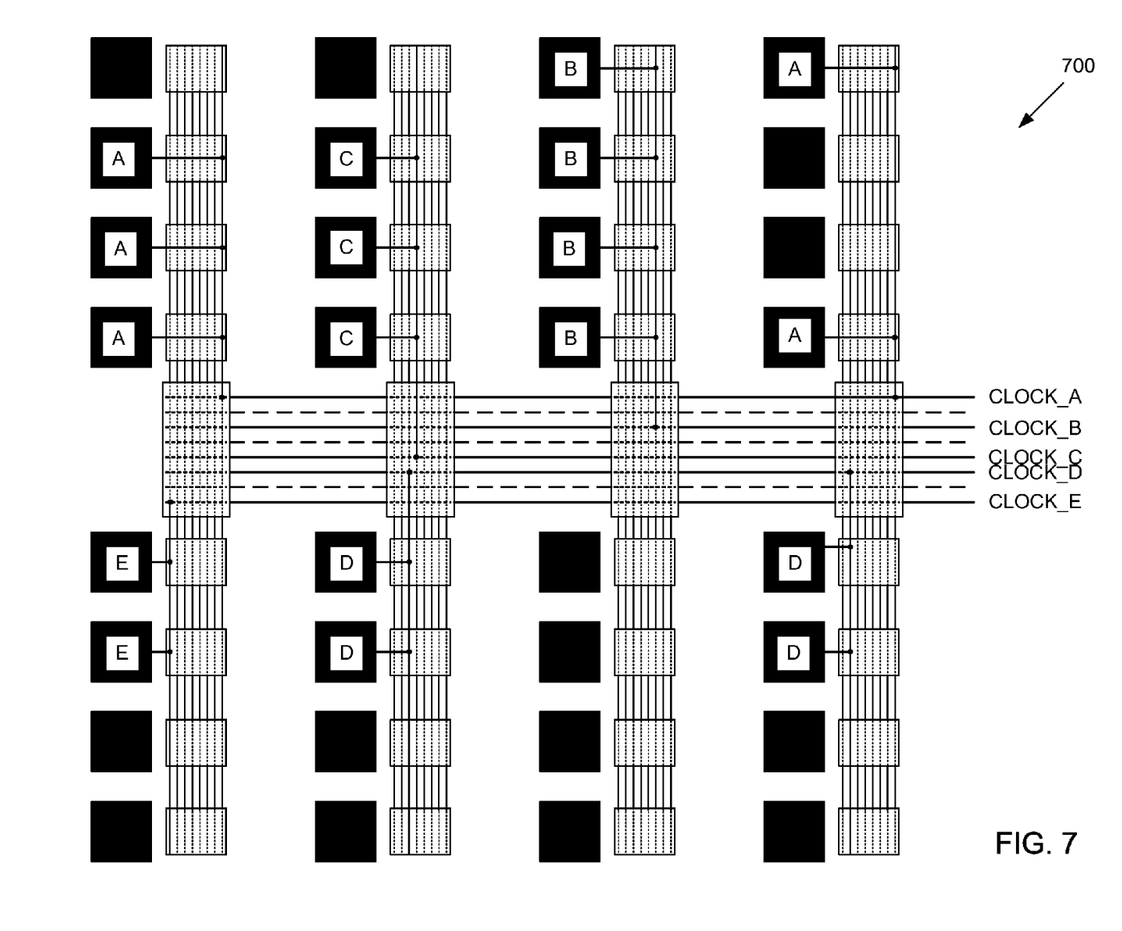
FIG. 7 illustrates a block diagram of an optimized clock signal load placement in accordance with one embodiment of the present invention.

Turning to FIG. 7, an exemplary block diagram of FPGA clock region 700 is illustrated after optimization of the placement of load components A-E of FIG. 6 has been realized by ISE block 234. It is noted that the total number of vertical clock spines utilized in FIG. 7 is equal to 7, whereas the total number of vertical clock spines utilized in FIG. 6 is equal to 18. Thus, by minimization of the vertical clock spine cost function value of equation (1) by ISE block 234, a decrease in vertical clock spine usage of approximately 61% is realized by example.

Figure 8:
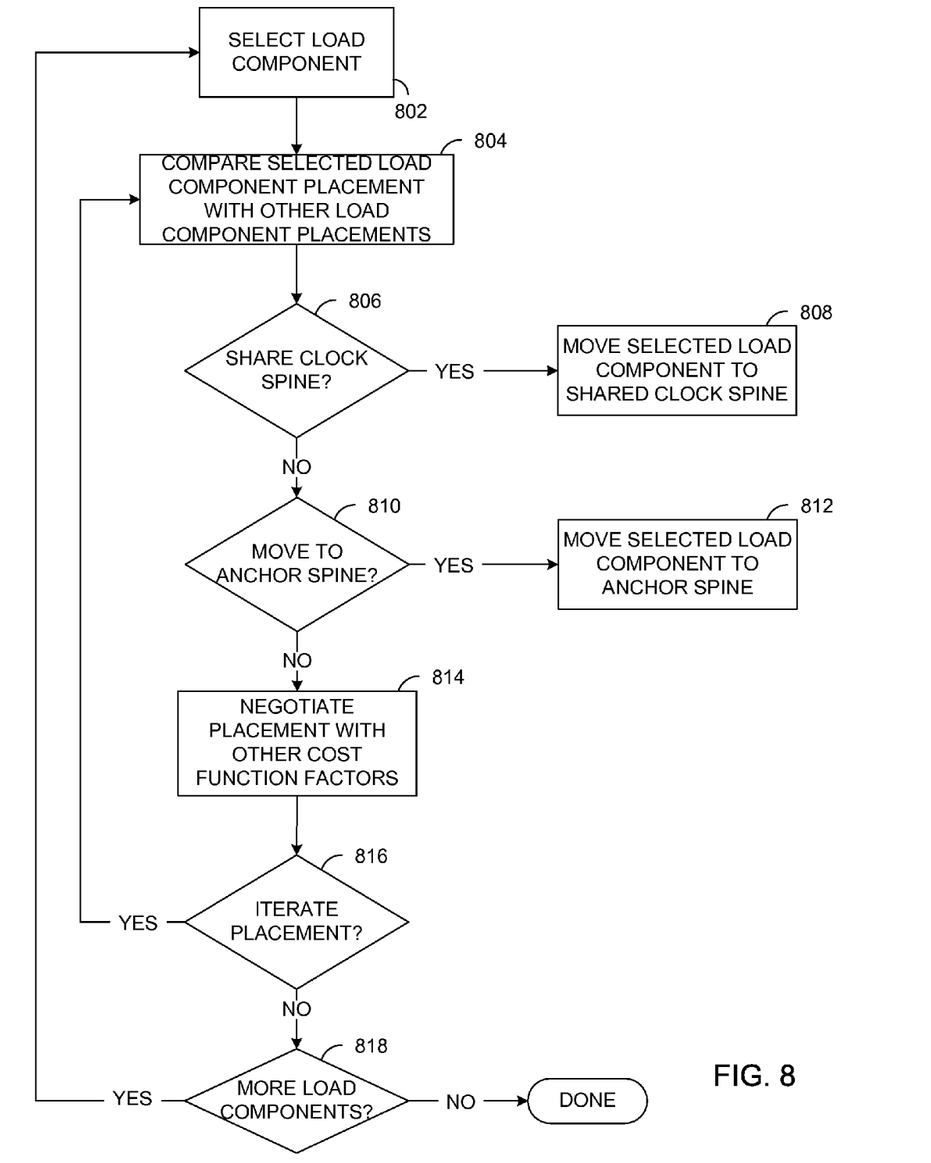
FIG. 8 exemplifies a flow diagram of a method of reducing clock signal power consumption within an integrated circuit in accordance with the various embodiments of the present invention.

Turning to FIG. 8, a flow diagram of a method of minimizing vertical clock spine usage in an integrated circuit is illustrated in accordance with the various embodiments of the present invention. In step 802, a load component and its current placement is selected from a plurality of load components previously placed in accordance with a proposed layout of the integrated circuit. In step 804, the selected load component is evaluated by ISE block 234 to determine whether the current placement of that load component can share a vertical clock spine with other load components that share the same clock signal. In particular, maximization of the number of load components that couple to the same vertical clock spine results in a decrease in the vertical clock spine cost function value. If the selected load component can share a vertical clock spine with other load components, as determined in step 806, then the selected load component is moved to the shared vertical clock spine as in step 808, i.e., the selected load component is placed into a geographic location within the integrated circuit that facilitates coupling the selected load component to the shared vertical clock spine.

In step 810, ISE block 234 also seeks the shortest distance between the selected load component and the closest anchor spine, which results in a decrease in the vertical clock spine cost function value. If the selected load component may be optimally moved to the closest anchor spine, then the selected load component is moved to the closest anchor spine as in step 812, i.e., the selected load component is placed into a geographic location within the integrated circuit that facilitates coupling to the anchor spine. It is noted that if the selected load component already couples to an anchor spine, then no movement of the selected load component is necessary.

Since ISE block 234 seeks to minimize vertical clock spine usage, while also minimizing deleterious effects on other aspects of the placement, the relative priority of the anchoring and attracting factors with other cost function factors, such as wire length and timing, are negotiated by ISE block 234 in step 814 so as to maintain the overall quality of the placement. Should the load component's placement need to be adjusted based upon the vertical clock spine cost function, or other cost function parameters, as determined in step 816, then the placement is re-iterated as in steps 804-814. If, on the other hand, the current load component's placement is acceptable and if other load components need to be optimally placed as determined in step 818, then the next load component is selected in step 802 and the placement optimization algorithm is executed by ISE block 234 for the next load component selected.

Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A method of optimally placing load components within an integrated circuit to reduce power consumption within the integrated circuit, the method comprising:

selecting an initial placement for a plurality of load components within the integrated circuit, the integrated circuit including a plurality of vertical spines configured to route clock signals to the plurality of load components in the initial placement;

selecting, for each of one or more of the clock signals, one or more of the vertical spines used to route the clock signal as corresponding anchor spines; and for each load component of the plurality of load components initially placed, evaluating, using a processor, a power cost for the initial placement;

determining, in an alternative placement, a distance from the load component to the anchor spine corresponding to the clock signal received by the load component;
evaluating a power cost for the alternative placement as a function of the determined distance; and
in response to determining that the power cost of the initial placement is greater than the power cost of the alternative placement, moving the load component to the alternative placement.

2. The method of claim 1, further comprising identifying a clock signal that is provided to the load component.

3. The method of claim 2, further comprising identifying clock signals that are provided to the remaining plurality of load components.

4. The method of claim 3, further comprising identifying the clock signals provided to the remaining plurality of load components that are the same as the clock signal provided to the selected load component.

5. The method of claim 1, wherein moving the selected load component to the alternative placement is only performed in response to determining that the load component is not coupled to an anchor spine.

6. The method of claim 1, further comprising determining whether the load component shares a clock signal with one or more of the remaining plurality of load components.

7. The method of claim 6, wherein moving the load component to the alternative placement is only performed in response to determining the load component shares a clock signal with one or more of the remaining plurality of load components.

8. The method of claim 7, wherein moving the selected load component to the alternative placement comprises moving the load component to a geographic location within the integrated circuit that facilitates coupling the load component to one of the plurality of a vertical spines that provides the shared clock signal.

9. The method of claim 1, wherein:
evaluating the power cost for the initial placement includes, for each vertical spine of the plurality of vertical spines, determining a first value equal to S/L, where S is a constant cost function value for a load component using one of the vertical spines, and L is the total number of load components that may be connected to the vertical spine; and
summing the first values to determine the power cost of the initial placement.

10. The method of claim 1, wherein:
evaluating the power cost for the alternative placement includes, for each vertical spine of the plurality of vertical spines, determining a first value equal to A*D, where A is a constant cost function value for a load component using one of the vertical spines, and D is the total number of load components that may be connected to the vertical spine; and
summing the first values to determine the power cost of the alternative placement.

11. A logic block placement system, comprising:
a processor adapted to execute physical design tools to facilitate placement of logic blocks within an integrated circuit to reduce power consumption within the integrated circuit, the processor being adapted to:
select an initial placement of a plurality of load components within a proposed integrated circuit layout, the integrated circuit including a plurality of vertical spines configured to route clock signals to the plurality of load components in the initial placement;
select, for each of one or more of the clock signals, one or more of the vertical spines used to route the clock signal as a corresponding anchor spine; and
for each of the plurality of load components initially placed, the processor is further adapted to
evaluate a power cost for the initial placement;
determine a distance from the load component in an alternative placement to the anchor spine corresponding to the clock signal received by the load component;
evaluate a power cost for the alternative placement, as a function of the determined distance; and
in response to determining that the power cost of the initial placement is greater than the power cost of the alternative placement, move the load component to the alternative placement.

12. The system of claim 11, wherein the processor is further adapted to identify a clock signal that is provided to the load component.

13. The system of claim 12, wherein the processor is further adapted to identify clock signals that are provided to the remaining plurality of load components.

14. The system of claim 13, wherein the processor is further adapted to identify the clock signals provided to the remaining plurality of load components that are the same as the clock signal provided to the load component.

15. The system of claim 11, wherein the processor is further adapted to move the load component to the alternative placement only in response to a determination that the load component is not coupled to any anchor spine corresponding to the one or more of the clock signals.

16. The system of claim 11, wherein the processor is further adapted to determine whether the load component shares a clock signal with one or more of the remaining plurality of load components.

17. The system of claim 16, wherein the processor is further adapted to move the load component to the alternative placement only in response to determining that the load component shares a clock signal with one or more of the remaining plurality of load components.

18. The system of claim 17, wherein the processor is further adapted to move the load component to a geographic location within the integrated circuit that facilitates coupling the selected load component to a vertical clock spine that provides the shared clock signal.

* * * * *